United States Patent [19]
Moore

[11] Patent Number: 5,145,474
[45] Date of Patent: Sep. 8, 1992

[54] CHILDREN'S APPARATUS FOR RECREATION AND FOR LEARNING WORLD GEOGRAPHY

[76] Inventor: Joseph L. Moore, 918 Green Valley Dr., Abilene, Tex. 79601

[21] Appl. No.: 668,223

[22] Filed: Mar. 12, 1991

[51] Int. Cl.[5] ............................................. A63B 22/00
[52] U.S. Cl. ..................................... 482/51; 482/146; 482/148
[58] Field of Search .................... 272/111, 146, 28 R, 272/46, 69; 434/133, 136, 137, 139, 140, 147; 482/51, 66, 74, 54, 146, 148

[56] References Cited

U.S. PATENT DOCUMENTS

| | | | |
|---|---|---|---|
| 2,897,607 | 8/1959 | Park | 434/140 |
| 2,957,252 | 10/1960 | Pain | 434/136 |
| 3,243,897 | 4/1966 | West | 434/140 |
| 3,306,626 | 2/1967 | Kawada | 272/146 |
| 4,126,326 | 11/1978 | Phillips | 272/69 |

Primary Examiner—Stephen R. Crow

[57] ABSTRACT

A children's playground or recreational apparatus is provided in which the bottom half of a large world globe is encased in a stationary socket, there being between the surface of said globe and said socket a means for supporting said globe and for producing frictional drag against the globe's surface in order to restrict the globe's potential rotational speed to a manageable limit. A child achieves an erect and balanced stance atop the globe, and by an asymmetrical shift in foot position and/or weight causes the globe to rotate in a desired direction at a desired speed, thus enabling the child to "walk around the world". The globe is provided with a slip-resistant surface, and padding or other protection is provided around the base of the apparatus to attenuate the effects of a fall. The apparatus can be entertaining and recreational, it can develop enhanced balance, coordination and agility, and it can provide a fun means for learning about world geography.

1 Claim, 1 Drawing Sheet

CHILDREN'S APPARATUS FOR RECREATION AND FOR LEARNING WORLD GEOGRAPHY

BACKGROUND OF THE INVENTION

The present invention relates to a children's playground or recreational apparatus, which additionally provides the means and incentive for learning basic world geography. The invention addresses two commonly-held concerns relating to today's children: 1) often children are too inactive and out-of-shape to be considered truly healthy, and 2) often children have a deplorable deficit of knowledge concerning global geography and world political boundaries. These are the two problems which it is the purpose of this invention to help overcome, by offering children both a physical challenge and an intellectual stimulus. The present invention features a large world globe the bottom half of which is housed in a stationary socket in such a way that a child can stand balanced atop said globe and by shifting weight and foot position can cause the globe to rotate as desired, thereby allowing the child to "walk" to anywhere on the globe.

PRIOR ART

In the art of record are various apparatus in which a large sphere, representing a heavenly body such as the planet Earth, is mechanically rotated to achieve some specific objective(s). For example, Pain (U.S. Pat. No. 2,957,252) presents a large bas-relief world globe supported on spring-loaded casters which is rotated and oriented to permit easy viewing of its geographical features by bringing a mechanically-driven wheel with a readily compressible surface into contact with the peripheral surface of the globe. West (U.S. Pat. No. 3,243,897) presents an apparatus in which a mechanically-rotated large sphere, supported on smaller spheres, has about it a halo plane for the purpose of simulating and plotting the orbital path of a space vehicle about a sphere. Park (U.S. Pat. No. 2,897,60) presents a large sphere supported on bearings which is mechanically rotated during the simulated orbiting of an artificial satellite about said sphere.

None of the aforementioned apparatus shares in common with the present invention the objectives of 1) providing a means of recreational exercise and motor skills enhancement for children, and 2) providing a means for children to learn about world geography kinesthetically. Consequently, in contrast to the present invention, none of the apparatus of prior art is designed specifically and appropriately for having the rotation of its large sphere induced and controlled by the feet of a child walking balanced atop said sphere.

Kawada, in U.S. Pat. No. 3,306,626, provides a plaything comprising a platform supported on a sphere by means of rollers. The objective of the user is to stand balanced on said platform and by means of coordinated body movements to cause the apparatus to move along a tortuous path. This is strictly an exercise/recreational device. It differs fundamentally and radically from the invention here disclosed in two ways: 1) during use, the Kawada device does not remain in stationary position while the user walks atop it for exercise and entertainment, and 2) the Kawada device does not have as a primary objective the promotion of geographic literacy.

In summation, there has been no provision in known prior art for simultaneously addressing both the problem of children's inadequate physical conditioning and the problem of children's inadequate knowledge of world geography. The present invention, however, offers an integrated solution to said problems by providing a motivating context in which children can learn world geography while at the same time recreating and enhancing such motor skills as balance and coordination, and herein lies the uniqueness of this invention. It provides the needed stimulus for learning world geography by couching said academic pursuit in an atmosphere of play, physical challenge and competition. No other known apparatus allows users to "walk" balanced atop a large globe by using their feet to rotate and guide said globe within its stationary socket.

SUMMARY AND OBJECTS OF THE INVENTION

In response to the dual needs of children to be physically fit and to develop a working knowledge of world geography, and in response to the inadequacies of the art of record in offering a unified solution for said problems, the present invention provides a safe and effective recreational/educational device that provides for and motivates both the physical and the cognitive development of children, i.e., it can enhance their motor skills and general fitness as well as their geographic literacy.

I have discovered an enjoyable developmental apparatus for children between the approximate ages of four and nine years that is both recreational and educational in nature. This invention combines the multiple advantages of providing the opportunity for 1) entertainment, 2) exercise, 3) developing motor skills such as balance, coordination and agility, and 4) learning in an enjoyable way certain basic geographical information such as the names and relative locations of oceans, seas, continents, countries, islands and national capitals, as well as certain geo-political subdivisions such as states and territories.

The overall configuration of the invention generally resembles an oversized ball and socket unit of the type commonly used for the application of roll-on deodorants. In the embodiment of this invention, a large world globe is positioned within a stationary socket which is part of a base supported by what is commonly referred to as the ground. Said socket encases slightly more than the bottom half of the globe, allowing the globe to be rotated in any direction but not to be removed from the socket. Between the concave surface of the socket and the peripheral surface of the globe, a means is provided that supports the globe and that also helps restrict to a manageable limit the globe's rotational speed by producing frictional drag against the globe's surface, in order to keep it from turning so easily and/or quickly that it would be impossible for a child to balance atop the globe and "walk" it in a manner similar to the action of "walking" a barrel. The globe and socket assembly are large and sturdy enough to support the weight of a child standing erect and balanced atop the globe. From that posture and by a coordinated shifting of foot position and/or weight in an asymmetrical manner, the child will be able to activate the globe's movement and to control its rotational direction and speed. Thus, the child will be able to "walk" to any place on the globe. The globe's surface is slip-resistant, and protection is provided around the base of the invention to render falls harmless.

It is therefore an object of the present invention to provide a unique means of entertainment and reaction for a child. Another object of the invention is to provide an interesting and challenging way for a child to develop enhanced skills in balance and coordination. It is a further object of the invention to provide a means for a child to gain valuable insights and knowledge about world geography by being able to "walk around the world".

These and other objects and advantages of this invention will become more apparent to those skilled in the art by referring to the following detailed description of the preferred embodiment viewed in light of the accompanying drawings.

DETAILED DESCRIPTION OF THE PREFERRED EMBODIMENT

The following description and the appended drawings present a preferred embodiment of the invention, but it should be understood that the present disclosure is only exemplary of the principles and essence of the invention and is not intended to limit the invention to the specific embodiment herein described and illustrated. The true scope and range of the invention is detailed in the appended claims.

Figure 1:
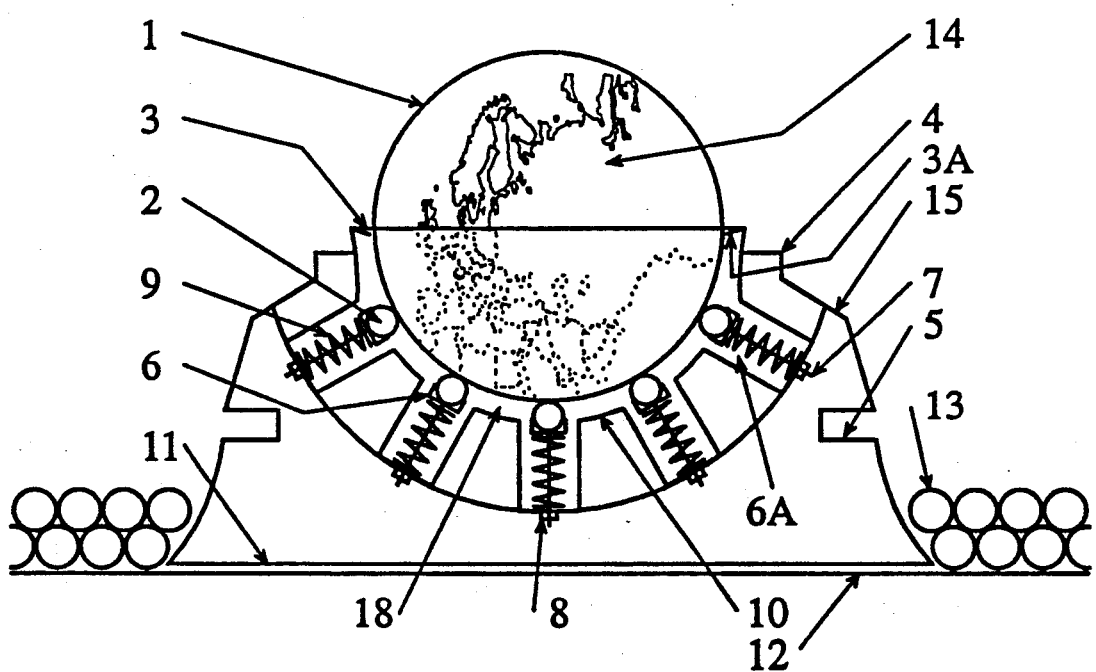
FIG. 1 is a transverse sectional view of a children's playground or recreational apparatus by which world geography can be learned, constructed in accordance with the teaching of the present invention.

As illustrated in FIG. 1 of the drawings, in a preferred embodiment of the invention a means 11 is provided for supporting a large sphere 1 and for housing said sphere in a socket-like hollow 18. What is generally referred to as ground level may be located variously at horizontal line 12 or on any horizontal line parallel to line 12 and at a vertical height between 12 and a point slightly lower than 3. Regardless of where ground level is located, means such as 4, 15 and 5 can be provided to aid a child in climbing up on top of the sphere 1.

As illustrated in FIG. 1, a large sphere 1 is provided which is constructed preferably, but not necessarily, of hard plastic. Said sphere is housed in a socket-like hollow 18 in the support means 11. Slightly more than the bottom half of the sphere 1 is encased in the socket 18, and as a result less than one half of the sphere is visible at any one time. The top edge of the socket 18 is indicated at 3 and the bottom at 10. The socket 18 is constructed in such a way that the sphere 1 can be rotated in any direction, but the sphere 1 cannot be removed from the socket 18. A means is provided for supporting said sphere and restricting its rotational speed. As illustrated, one possible embodiment of said means could be an array of small roller-balls 2 constructed preferably, but not necessarily, of hard plastic and protruding from the concave surface of socket 18. The roller-balls 2 press and rotate against the sphere 1 as it rotates, thereby producing the necessary resistance that prevents the sphere 1 from rotating with too much facility and/or velocity. Each roller-ball 2 is housed in a socket 6 and is held in contact with the outer surface of the sphere 1 by means of a compression spring 9. The compression spring 9 is held in place by a socket shank 7 and a threaded nut 8. The base of the socket that holds the roller ball 2 is guided in its movement up or down by the socket well 6A which houses the compression spring 9 and the socket shank 7.

The incorporation of small, hard roller balls mounted on compression springs for the purpose of supporting a large sphere is not new art, but what is probably unique is using said roller-ball mechanism in conjunction with a textured sphere surface to produce frictional drag that reduces the velocity of the sphere's rotational spin to a level manageable by a child walking atop said sphere. The same dual purposes of sphere support and rotational speed limitation can alternatively be accomplished by some other means such as the use of one or more compressible balls between the surface of the sphere and the socket. With this variation, the amount of compressible ball surface entering into contact with the sphere and consequently the amount of frictional drag on rotation would be directly proportional to the weight of the user producing the ball compression.

Referring to FIG. 1, a means 3A is provided for sealing off the space between the sphere 1 and the top rim 12 of the socket 18 to prevent debris from entering the mechanism and interfering with the rotation of the sphere. The sphere 1 (hereafter referred to as a globe) has a map of the world 14 imprinted on its entire outer surface. The various geographical entities and geopolitical areas can be delineated and highlighted with attractive, contrastive colors.

Figure 2:
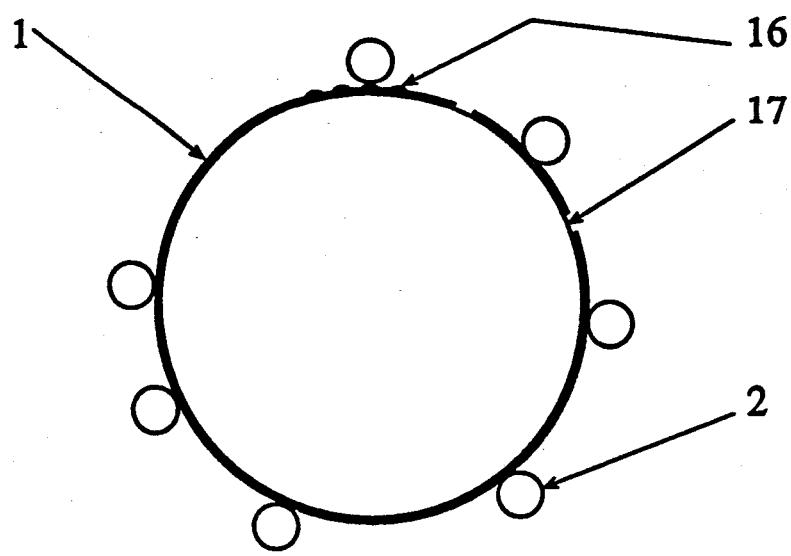
FIG. 2 is a top sectional view of the globe and roller-ball portions of the apparatus (shown in FIG. 1) for the purpose of detailing the grooved or ridged nature of the outer surface of the globe.

Still referring to FIG. 1, both the support means 11, with its various components, and the globe 1 are intended to be large and sturdy enough to easily support a child standing erect atop the globe and creating an asymmetrical weight distribution and/or foot position so as to cause the globe to rotate within its socket 18. The overall objective of the invention is that the child will be able to acquire such skill in balance, coordination and agility that he/she will be able to "walk" to anywhere on the globe without falling off, and in the process will learn a lot about world geography. As illustrated in FIG. 2, the entire outer surface of the globe 1 is uniformly textured in some manner such as with closely-placed friction grooves 71 or friction ridges 16 which crisscross the globe in checkerboard fashion so as to provide a roughened surface that 1) affords good traction for the child standing atop the globe and 2) increases the friction between the globe's outer surface and the means for supporting the globe and limiting its rotational speed (whether it be the pictured array of roller-balls 2 or some other embodiment) in order to keep the globe from rotating uncontrollably fast. This necessary friction between globe 1 and roller-balls 2 (or some other form of globe support and rotational speed limiting means) during rotation makes the operation of the apparatus more manageable by increasing the amount of torque required to cause the globe to rotate.

As previously mentioned, what is commonly referred to as ground level may be variously placed in relationship to the invention with maximum safety in mind. Additionally, as illustrated in FIG. 1, a means 13 is provided to attenuate the effect of a fall. Said padding or protection means can be built up around the apparatus to any desired height.

From the foregoing description, one skilled in the art can easily ascertain the essential characteristics and principles of this invention and, obviously, without departing from the spirit and scope thereof one can make changes and modifications to the present invention and make variations thereof. Consequently, it is to be understood that such changes, modifications and variations are properly, equitably and intended to be within the full scope of the equivalence of the following claims.

What is claimed is:

1. A children's apparatus for recreation and for learning wold geography comprising:
- a stationary base having a planar ground engaging surface, said base including a hemispherical socket;
- a universally rotatable world map globe housed in said socket;
- means for supporting said globe in said socket and for limiting the rotational speed of said globe, said support and rotational speed limitation means being located between the peripheral surface of said globe and the peripheral surface of said socket;
- means for facilitating access to the top of said globe;
- means for cushioning a user's fall from said globe and wherein the peripheral surface of said globe is uniformly and universally textured to augment frictional drag against said globe support means and rotational speed limitation means during globe rotation and also to provide a slip resistant surface for user engagement;
- wherein upon application of torque to the peripheral surface of the globe through the feet of a child erect atop the globe, the globe is caused to rotate.

* * * * *